3,068,228
16α-LOWER ALKYL PREGNANE AND CHOLENO DERIVATIVES

Meyer Sletzinger and Donald F. Reinhold, North Plainfield, and Sandor Karady, Rahway, N.J., assignors to Merck & Co., Inc., Rahway, N.J., a corporation of New Jersey
No Drawing. Filed Sept. 5, 1958, Ser. No. 759,116
13 Claims. (Cl. 260—239.57)

This application is a continuation-in-part of our copending application Serial No. 754,181, filed August 11, 1958, now abandoned.

This invention is concerned generally with steroid compounds and with novel processes of preparing the same, more particularly, it relates to 16α-alkyl-11-oxygenated steroids of the pregnane series unsaturated in ring A.

The 16α-alkyl steroids produced in accordance with this invention possess extremely high anti-inflammatory activity, considerably greater than that of the parent steroids and are especially effective for the treatment of arthritis and related diseases since they can be administered for their cortisone-like action in extremely low dosage thereby minimizing undesired side effects.

In preparing these active compounds, the starting material utilized may be 3β-acyloxy-16α-alkyl-5(6)-pregnen-20-one which may be represented as follows:

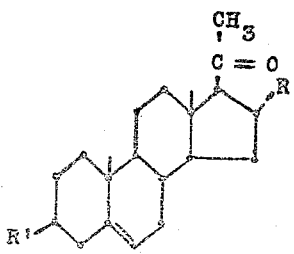

where R is alkyl, and R' is acyloxy.

This starting material namely 3β-acyloxy-16α-alkyl-5(6)-pregnen-20-one can be prepared by reacting 3-acyloxy-5(6),16-pregnadien-20-one with an alkyl magnesium halide to form 16α-alkyl-3β-hydroxy-5(6)-pregnen-20-one and acylating the latter compound with an acyl anhydride in the presence of pyridine to form 3β-acyloxy-16α-alkyl-5(6)-pregnen-20-one.

The 3β-acyloxy-16α-alkyl-5(6)-pregnen-20-one can be reacted with a halogen to form 3β-acyloxy-16α-alkyl-5,6-dihalo-pregnane-20-one which may be represented as follows:

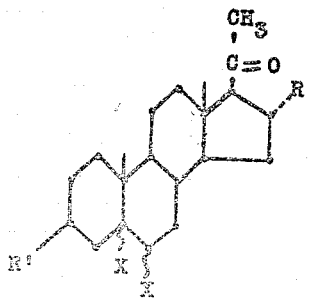

where R is alkyl, R' is acyloxy and X is halogen.

It has been found that 3β-acyloxy-16α-alkyl-5,6-dihalo-pregnane-20-one may be caused to react with dialkyl oxalate such as dimethyl oxalate, diethyl oxalate, etc. to form the alkyl ester of 16α-alkyl-5,6-dihalo-3β-hydroxy-20-oxo-21-pregnaneglyoxylic acid which has the following structural formula—

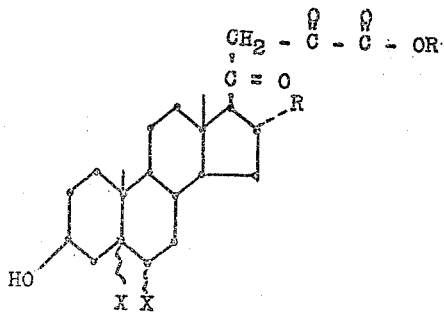

where R and X are as above.

Upon reaction of the alkyl ester of 16α-alkyl-5,6-dihalo-3β-hydroxy-20-oxo-21 - pregnaneglyoxylic acid with an alkali metal hydroxide, there is formed 16α-alkyl-5,6-dihalo-3β-hydroxy - 20 - oxo - 21 - pregnaneglyoxylic acid which may be structurally represented as follows:

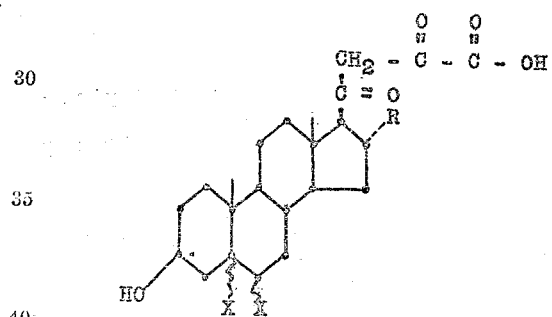

where R and X are as above.

Treatment of the 16α-alkyl-5,6-dihalo-3β-hydroxy-20-oxo-21-pregnaneglyoxylic acid with a strong acid such as dinitrobenzene sulfonic acid or perchloric acid and acyl anhydride yields 3β,23-diacyloxy-16α-alkyl-5,6-dihalo-21-normethyl - 17(20),22 - choladieno - 24(20)lactone which has the following structural formula:

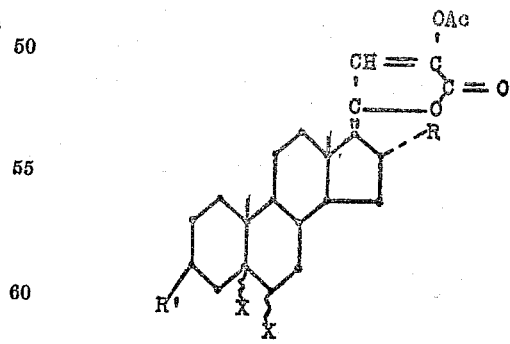

wherein R, R' and X are as above.

The 3β,23-diacyloxy-16α-alkyl-5,6-dihalo-21-normethyl-17(20),22-choladieno-24(20)-lactone can be reacted with a peracid such as perbenzoic acid to form 3β,23-diacyloxy - 16α-alkyl-5,6-dihalo-21-normethyl - 17(20) - oxido- 22-cholano-24(20)lactone which has the following structural formula:

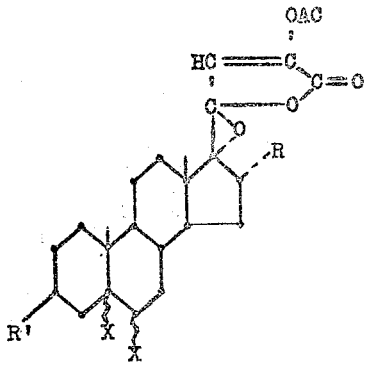

wherein R, R' and X are as above.

When 3β,23-diacyloxy-16α-alkyl-5 6-dihalo-21 - normethyl - 17(20)-oxido-22-cholano-24(20)-lactone is reacted with base, the epoxy ring is broken and there is obtained 16α-alkyl-5,6-dihalo-3β,17α-dihydroxypregnan-20-one which has the following structural formula:

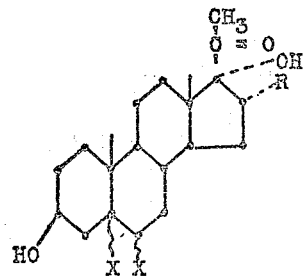

Halogenation of 16α-alkyl-5,6-dihalo-3β,17α-dihydroxypregnan-20-one results in the formation of 16α-alkyl-5,6,21-trihalo-3β,17α-dihydroxy-pregnan-20-one which may be represented as follows:

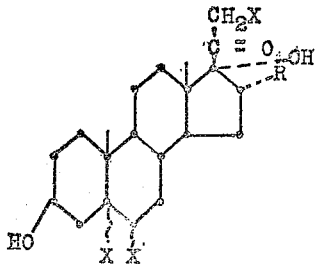

wherein R and X are as above.

Treatment of 16α-alkyl-5,6,21-trihalo-3β,17α-dihydroxy-pregnan-20-one with an acylating agent results in the formation of 16α-alkyl-5,6-dihalo-3β,17α,21-trihydroxy-pregnan-20-one 21-acylate which may be indicated as follows:

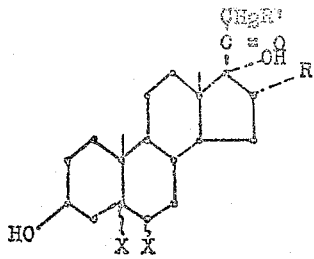

wherein R, R' and X are as above.

When 16α-alkyl-5,6-dihalo-3β,17α,21-trihydroxy-pregnan-20-one 21-acylate is oxidized with an oxygenating agent such as chromium trioxide there is obtained 16α- alkyl-5,6-dihalo-17α,21-dihydroxy-pregnan-3,20-dione 21-acylate which may be indicated as follows:

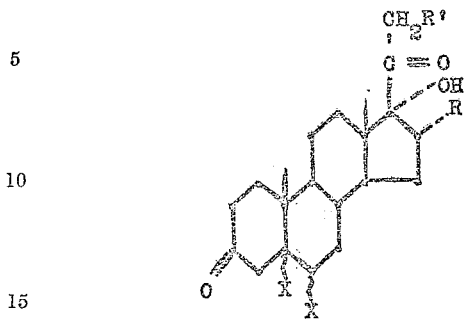

wherein R, R' and X are as above.

Chromous halide when reacted with 16α-alkyl-5,6-dihalo-17α,21-dihydroxy-pregnan-3,20-dione 21-acylate removes halogen atoms at positions 5 and 6 and results in the 16α-alkyl-17α,21-dihydroxy-4-pregnene-3,20-dione 21-acylate which has the following structural formula:

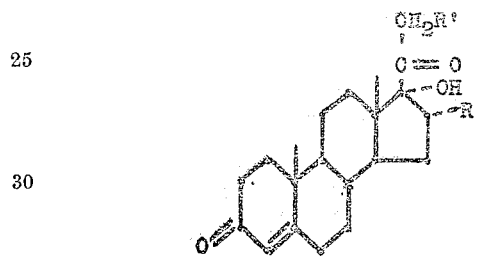

wherein R, and R' are as above.

The 16α-alkyl-17α,21-dihydroxy-4-pregnene-3,20-dione 21-acylate can be reacted with selenium dioxide to effect ring A dehydrogenation, thereby forming the 16α-alkyl-17α 21-dihydroxy-1,4-pregnadiene-3,20-dione 21 - acylate compound. This selenium dioxide dehydrogenation procedure is carried out by reacting 16α-alkyl-17α,21-dihydroxy-4 pregnene-3,20-dione compound and selenium dioxide in the presence of an organic solvent such as dioxane and an alcohol solvent such as t-butanol and heating the mixture at an elevated temperature. The reaction mixture is filtered, thereby removing metallic selenium and the filtered solution is evaporated to dryness in vacuo to give the desired 16α-alkyl-17α,21-dihydroxy-1,4-pregnadiene-3,20-dione 21-acylate compound.

The 16α-alkyl-17α,21-dihydroxy-1,4-pregnadiene 3,20-dione 21-acylate can be subjected to a microbial procedure to introduce an hydroxy group in the 11-position, thus forming 16α-alkyl-11,17α,21-trihydroxy-1,4-pregnadiene-3,20-dione 21-acylate which possesses extremely high anti-inflammatory activity.

The hydroxy group at 11-position can be introduced by subjecting 16α-alkyl-17α,21-dihydroxy-1,4-pregnadiene-3,20-dione 21-acylate to an oxygenating strain of the organism *Curvularia lunata* (Northern Regional Research Laboratories, No. 2434) in a suitable nutrient medium.

In all of the previously described reactions, R has been designated as alkyl, and is intended to include the lower alkyl groups such as methyl, ethyl and propyl, or aryl alkyl. R' has been indicated as acyloxy. The acyloxy groups that may be employed in these reactions include lower hydrocarbon carbonyloxy esters such as benzoate, lower alkanoates such as acetoxy, and propionoxy, X is halogen and is intended to include bromo, chloro, fluoro and iodo. It will be evident to those skilled in the art that other groups may be substituted for those recited here and these definitions are intended only as some indication of the operable class of compounds intended.

The following experimental part illustrates in detail some of the compounds which constitute this invention and methods for their production. However, this invention is not to be construed as limited thereby in spirit or in scope since it will be apparent to those skilled in the art that many modifications in materials and methods may be made without departing from the invention.

EXAMPLE 1

*Preparation of 3β-Acetoxy-5,6-Dichloro-16α-Methyl-20-Pregnanone*

Chlorine gas was slowly bubbled into 40 ml. of benzene containing .21 ml. of pyridine. Simultaneously, a solution of 6.0 g. of 3β-acetoxy-16α-methyl-5(6)-pregnen-20-one in .40 ml. of benzene containing .21 ml. of pyridine was added to the chlorine-benzene solution. The rate of addition of the steroid solution was adjusted so that a slight excess of chlorine was present. The addition of the steroid required 25 minutes. The reaction mixture was poured into 5% sodium thiosulfate solution to destroy the excess chlorine. The benzene solution was washed with 5% hydrochloric acid, sodium bicarbonate solution and water. The benzene solution was then dried and concentrated to dryness. The residue was dissolved in hot acetone treated with charcoal and filtered. The filtrate was evaporated on the steam bath until crystallization started. The mixture was cooled and filtered to yield 3β-acetoxy-5,6-dichloro-16α-methyl-20-pregnanone which melted at 195°–198° C.

The 3β-acetoxy-16α-methyl-5(6)-pregnen-20-one used as a starting material in this example is prepared as follows:

A solution of 10 g. of methyl iodide in 40 ml. of ether is added to 1.73 g. of magnesium in 50 ml. of ether. To the resulting 90 ml. of ethereal solution of methyl magnesium iodide, maintained under a nitrogen atmosphere was added 50 ml. of ether followed by the addition of .64 g. of cuprous chloride. The mixture was stirred vigorously for 1.5 hours at 20° C. and then refluxed for ½ hour. At the end of this time the yellow cuprous chloride was converted to a fine black insoluble powder. A solution of 16.4 g. of 3-acetoxy-5(6), 16-pregnadiene-20-one in 500 ml. of absolute ether, was added over a period of 1 hour. The mixture was then refluxed for 6 hours with stirring. The methyl magnesium iodide complex and excess methyl magnesium iodide was decomposed by the careful addition of 150 ml. of 10% sulfuric acid. The mixture was then filtered through diatomaceous earth and transferred to a separatory funnel. The aqueous acetic layer was separated and back extracted with 200 ml. of ethyl acetate. The ethyl acetate was combined with the ether layer and washed successively with water, 5% sodium sulfite solution, water, 10% sodium bicarbonate solution and finally with water. The organic solution was dried and concentrated in vacuo until crystallization started. The ethyl acetate solution was then distilled at atmospheric pressure until crystallization of 3β-hydroxy-16α-methyl-5(6)-pregnen-20-one began. The solution was cooled to 10° C. and filtered. Wt. 10.89 g. M.P. 182–188° C. Recrystallization from ethyl acetate raises the melting point to 189–191° C.

A mixture of 50.0 g. of 3β-hydroxy-16α-methyl-5(6)-pregnen-20-one in 200 ml. of acetic anhydride and 200 ml. of pyridine was allowed to stand for 18 hours at 20° C. The mixture was concentrated to dryness and the residue dissolved in benzene. The benzene solution was washed with 25% sulfuric acid, saturated sodium bicarbonate solution and water. The benzene solution was dried and concentrated to dryness. Petroleum ether was added to induce crystallization. The 3β-acetoxy-16α-methyl-5(6)-pregnen-20-one was filtered and dried. Wt. 50.3 g. M.P. 181–185° C.

EXAMPLE 2

*Preparation of the Ethyl Ester of 5,6-Dichloro-3-Hydroxy-16α-Methyl-20-Oxo-21-Pregnaneglyoxylic Acid*

Sodium methoxide was prepared by adding 35 ml. of methanol to 3.18 g. of clean sodium in a 250 ml. round-bottom flask. To the mixture was added 100 ml. of dry toluene and the mixture was distilled slowly until the boiling point of the distillate was 110° C. Diethyl oxalate (24.6 grams) was then added slowly to the cooled sodium methoxide solution maintaining the temperature between 20–25° C. Then 11.8 grams of 3β-acetoxy-5,6-dichloro-16α-methyl-pregnane-20-one was added and the yellow solution stirred for 18 hours.

The mixture was poured slowly with stirring into 250 ml. of ether-petroleum ether (1:1) to precipitate the ethyl ester of 5,6-dichloro-3β-hydroxy-16α-methyl-20-oxo-21-pregnaneglyoxylic acid. Ethanol (100 ml.) was then added to the ethyl ester of 5,6-dichloro-3β-hydroxy-16α-methyl-20-oxo-21-pregnaneglyoxylic acid and the mixture acidified by addition of 2.5 N hydrochloric acid. To this mixture was added 250 ml. of water and 250 ml. of benzene and stirred for 10 minutes. The benzene layer was separated and washed with water until neutral. The benzene solution was dried and concentrated in vacuo to yield 16.3 g. of the ethyl ester of 5,6-dichloro-3β-hydroxy-16α-methyl-20-oxo-21-pregnaneglyoxylic acid. U.V./max. 2920, E% 135.

EXAMPLE 3

*Preparation of 5,6-Dichloro-3β-Hydroxy-16α-Methyl-20-Oxo-21-Pregnaneglyoxylic Acid*

To 16.3 grams of the ethyl ester of 5,6-dichloro-3β-hydroxy-16α-methyl-20-oxo-21-pregnaneglyoxylic acid was added 250 ml. of methanol and then over a period of 20 minutes 250 ml. of .5 N sodium hydroxide was added. The mixture was stirred for 5 hours and then rapidly heated to 70° C. and held at 70° C. for five minutes. The clear solution was cooled rapidly to 25° C. and acidified with 2.5 N hydrochloric acid. The precipitate was collected and washed thoroughly with water. The crude 5,6-dichloro-3β-hydroxy-16α-methyl-20-oxo-21-pregnaneglyoxylic acid was slurried with 100 ml. of acetonitrile, filtered and dried. Wt. 10.02 grams, M.P. 209–211° C. U.V./max. 2910, E% 208.

EXAMPLE 4

*Preparation of 3β,23-Diacetoxy-5,6-Dichloro-16α-Methyl-21-Normethyl-17(20),22-Choladieno-24(20)-Lactone*

Acetic anhydride (82 ml.) was added to 2.2 grams of 5,6-dichloro-3β-hydroxy-16α-methyl-20-oxo-21-pregnaneglyoxylic acid. To this suspension was added 300 mg. of dinitrobenzene sulfonic acid. The mixture was stirred for 2 hours and 300 mg. of potassium acetate was added and the solution concentrated in vacuo below 50° C. to dryness. The 3β,23-diacetoxy-5,6-dichloro-16α-methyl-21-normethyl-17(20),22-choladieno-24(20)-lactone was dissolved in 250 ml. of benzene and washed successively with two portions of 100 ml. of cold 2.5 sodium hydroxide and two portions of 100 cc. of water. The benzene solution was dried and concentrated to dryness to yield an orange-red oil which yielded light tan crystals on trituration with ethanol. The 3β,23-diacetoxy-5,6-dichloro-16α-methyl-21-normethyl-17(20),22-choladieno-24(20) - lactone weighed 8.6 g. U.V./max. 2990, E% 423.

EXAMPLE 5

*Preparation of 3β,23-Diacetoxy-5,6-Dichloro-16α-Methyl-21-Normethyl-17(20)-Oxido-22-Choleno-24(20) - Lactone*

A solution of 8.61 grams of 3β,23-diacetoxy-5,6-dichloro-16α-methyl-21-normethyl - 17(20),22 - choladieno-24(20)-lactone was dissolved in 82 ml. of .55 M perbenzoic acid in benzene. The solution was allowed to stand at room temperature for 5 days. The benzene solution was then washed successively with 5% sodium bisulfite solution, saturated sodium bicarbonate solution, and finally with saturated sodium chloride solution. The benzene solution was dried and concentrated to dryness to yield an oil which crystallized on addition of 50 ml. of petroleum ether. Filtration yielded 8.68 grams of 3β,23-diacetoxy- 5,6-dichloro-16α-methyl-21-normethyl - 17(20) - oxido-22-choleno-24(20)-lactone U.V./max. 2280, E% 194.

EXAMPLE 6

*Preparation of 5,6-Dichloro-3β,17α-Dihydroxy-16α-Methyl-Pregnan-20-One*

A solution of .5 g. of 3β,23-diacetoxy-5,6-dichloro-16α-methyl - 21 - normethyl-17(20)-oxido-22-choleno-24(20)-lactone in 6 ml. of tetrahydrofuran and 20 ml. of 2.5 N sodium hydroxide was stirred for 20 hours at room temperature. The tetrahydrofuran layer was separated and water added to precipitate 5,6-dichloro-3β,17α-dihydroxy-16α-methyl-pregnan-20-one. This product was filtered and the cake dissolved in ethyl acetate. The ethyl acetate solution was washed with sodium bicarbonate solution and water. Concentration of the ethyl acetate yielded 300 mg. of 5,6-dichloro-3β,17α-dihydroxy-16α-methyl-pregnan-20-one. M.P. 203–209° C. (dec.). Recrystallization from methanol raised the melting point to 215–216° C. dec.

EXAMPLE 7

*Preparation of 21-Bromo-5,6-Dichloro-3β,17α-Dihydroxy-16α-Methyl-Pregnan-20-One*

To a solution of .207 gram of 5,6-dichloro-3β,17α-dihydroxy-16α-methyl-pregnan-20-one in 5 ml. of chloroform containing .01 ml. of methanol was added over a period of 1 hour, 1.56 ml. of .352 M bromine in chloroform solution. The chloroform solution was poured into ether and washed successively with saturated sodium bicarbonate solution and water. The chloroform-ether solution was dried and concentrated to yield an oil which crystallized on standing. This crystalline material, namely, 21-bromo - 5,6 - dichloro-3β,17α-dihydroxy-16α-methyl-pregnan-20-one was recrystallized from benzene-petroleum ether. M.P. 190–194° C.

EXAMPLE 8

*Preparation of 5,6-Dichloro-3β,17α,21-Trihydroxy-16α-Methyl-Pregnan-20-One 21-Acetate*

A mixture of .305 gram of 21-bromo-5,6-dichloro-3β,17α-dihydroxy-16α-methyl-pregnan-20-one; .294 gram of potassium acetate; .233 gram of potassium iodide; .001 ml. of acetic acid in 6 ml. of acetone was refluxed with stirring for 18 hours. The mixture was diluted with water and filtered. The cake was dissolved in ethyl acetate and the ethyl acetate solution was washed with water, dried and concentrated to dryness. The crystalline residue of 5,6-dichloro-3β,17α,21-trihydroxy-16α-methyl-pregnan-20-one 21-acetate was crystallized from benzene-hexane mixture, and melted at 192–194° C. Paper chromatography of the 5,6-dichloro-3β,17α,21-trihydroxy-16α-methyl-pregnen-20-one 21-acetate gave a single spot (Rf .85) in the benzene-formamide system as detected with blue tetrazolium and also phosphoric acid.

EXAMPLE 9

*Preparation of 5,6-Dichloro-17α,21-Dihydroxy-16α-Methyl-Pregnan-3,20-Dione 21-Acetate*

A solution of .100 gram of 5,6-dichloro-3β,17α,21-trihydroxy-16α-methyl-pregnan-20-one 21-acetate in 2 ml. of acetic acid containing .2 ml. of water was cooled to 5° C. A solution of 22.7 mg. of chromium trioxide in .02 ml. water and .25 ml. of acetic acid was added dropwise to the solution, .012 ml. of concentrated sulfuric acid was then added and the temperature of the reaction maintained at 5° C. for 1 hour. The excess chromium trioxide was reduced with .02 ml. methanol and the mixture diluted with 8 ml. of water. The precipitate, containing 5,6 - dichloro-17α,21-dihydroxy-16α-methyl-pregnan-3,20-dione 21-acetate was filtered, washed thoroughly with water and dried in vacuo at room temperature.

EXAMPLE 10

*Preparation of 17α,21-Dihydroxy-16α-Methyl-4-Pregnene-3,20-Dione 21-Acetate*

An acetone solution of chromous chloride prepared from .5 gram of chromic chloride was added to .10 gram of 5,6 - dichloro-17α,21-dihydroxy-16α-methyl-pregnan-3,20-dione 21-acetate and refluxed for 5 minutes. The acetone was partially evaporated and then diluted with water. The precipitate, a mixture of the 4 and 5 pregnenes, was filtered, washed thoroughly with water and dried in vacuo at room temperature. The product was then dissolved in 4 ml. of acetone and the Δ⁵ double bond completely isomerized to Δ⁴ position by refluxing with .09 ml. of 1 N sulfuric acid in acetone. Acetone was distilled until crystallization started. The solution was cooled and filtered to yield 17α,21-dihydroxy-16α-methyl-4-pregnene-3,20-dione 21-acetate. M.P. 162–164° C. U.V./max. 2400, E%=400.

*Analysis.*—Calculated for $C_{24}H_{34}O_5$: C, 71.61; H, 8.52. Found: C, 71.56; H, 8.41.

EXAMPLE 11

*Preparation of 17α,21-Dihydroxy-16α-Methyl-1,4-Pregnadiene-3,20-Dione 21-Acetate*

A suspension of 5 grams of 17α,21-dihydroxy-16α-methyl-4-pregnene-3,20-dione 21-acetate in 190 ml. of t-amyl alcohol, 6 grams of $SeO_2$ and 6 grams of mercuric oxide is refluxed for 17 hours. The solution is filtered from the metallic suspension and evaporated to an oil which is then dissolved in ethyl acetate. The ethyl acetate solution is washed with aqueous sodium bicarbonate and then with water until neutral and dried. The solvent is evaporated from the dried solution to give an oil which is dissolved in benzene and adsorbed from this solvent on acid-washed alumina. The adsorbate is eluted with ether petroleum ether and then with mixtures of ether and chloroform. The eluates are evaporated to dryness and the residual mixture recrystallized from ethyl acetate ether to give 17α,21-dihydroxy-16α-methyl-1,4-pregnadiene-3, 20-dione 21-acetate.

EXAMPLE 12

*Preparation of 11β,17α,21-Trihydroxy-16α-Methyl-1,4-Pregnadiene-3,20-Dione 21-Acetate*

A medium is prepared having the following composition:

| | |
|---|---|
| Glucose | g.. 20 |
| An enzymatic lactoalbumen digest (Edamin) | g.. 20 |
| Cornsteep liquor | ml.. 5 |

Water to make 1 liter.

This medium is distributed in 50 ml. portions in appropriate vessels. The pH of the medium is adjusted to 6.5 with 1 M potassium hydroxide and sterilized at 120° C. for 12 minutes.

The medium in each vessel is then inoculated with a heavy aqueous suspension of spores of a strain of *Curvularia lunata* (Northern Regional Research Laboratory No. 2434) and the inoculated media are maintained at an incubation of 28° C. for 48 hours on a rotary shaking machine.

Ten mg. of 17α,21-dihydroxy-16α-methyl-1,4-pregnadiene-3,20-dione 21-acetate is added to each vessel from a dimethyl-formamide solution (100 mg./ml.). The transformation is allowed to go for an additional 24 hours under conditions identical to the growth phase. The whole broth is then extracted 3 times with equal volumes of ethyl acetate, the extracts combined and finally concentrated. The 11β,17α,21-trihydroxy-16α-methyl-1, 4-pregnadiene-3,20-dione 21-acetate is filtered off.

The 11β,17α,21-trihydroxy - 16α - methyl-1,4 - pregnadiene-3,20-dione 21-acetate thus obtained possesses high anti-inflammatory activity.

Various changes and modifications may be made in the present invention, certain preferred embodiments of

What is claimed is:

1. Ethyl ester of 5,6-dichloro-3β-hydroxy-16α-methyl-20-oxo-21-pregnaneglyoxylic acid.
2. 16α-lower alkyl-5,6-dichloro-3β-hydroxy-20-oxo-21-pregnaneglyoxylic acid.
3. 5,6-dichloro-3β-hydroxy-16α-methyl-20-oxo-21-pregnaneglyoxylic acid.
4. 3β,23-diacetoxy-5,6-dichloro-16α-methyl-21-normethyl-17(20),22-choladieno-24(20)-lactone.
5. 3β,23-diacetoxy-5,6-dichloro-16α-methyl-21-normethyl-17(20)-oxido-22-choleno-24(20)-lactone.
6. The process which comprises reacting 3β-lower acyloxy-16α-lower alkyl-5,6-dichloro-pregnan-20-one with a lower dialkyl oxalate to form the lower alkyl ester of 16α-lower alkyl-5,6-dichloro-3β-hydroxy-20-oxo-21-pregnaneglyoxylic acid.
7. The process which comprises reacting the lower alkyl ester of 16α-lower alkyl-5,6-dichloro-3β-hydroxy-20-oxo-21-pregnaneglyoxylic acid with an alkali metal hydroxide to form 16α-lower alkyl-5,6-dichloro-3-hydroxy-20-oxo-21-pregnaneglyoxylic acid.
8. The process which comprises reacting 16α-lower alkyl-5,6-dichloro-3β-hydroxy-20-oxo-21-pregnaneglyoxylic acid with dinitrobenzene sulfonic acid and lower acyl anhydride to form 3β,23-lower diacyloxy-16α-lower alkyl-5,6-dichloro-21-normethyl-17(20)-22-choladieno-24(20)-lactone.
9. The process which comprises reacting 3β,23-lower diacyloxy-16α-lower alkyl-5,6-dichloro-21-normethyl-17(20),22-choladieno-24(20)-lactone with a peracid to form 3β,23-lower diacyloxy-16α-lower alkyl-5,6-dichloro-21-normethyl-17(20)-oxido-22-choleno-24(20)-lactone.
10. The process which comprises reacting 3β,23-lower diacyloxy-16α-lower alkyl-5,6-dichloro-21-normethyl-17(20)-oxido-22-choleno-24(20)-lactone with base to form 16α-lower alkyl-5,6-dichloro-3β,17α-dihydroxy-pregnan-20-one.
11. Lower alkyl ester of 16α-lower alkyl-5,6-dichloro-3β-hydroxy-20-oxo-21-pregnaneglyoxylic acid.
12. 3β,23-lower diacyloxy-16α-lower alkyl-5,6-dichloro-21-normethyl-17(20),22-choladieno-24(20)-lactone.
13. 3β,23-lower diacyloxy-16α-lower alkyl-5,6-dichloro-21-normethyl-17(20)-oxido-22-choleno-24(20)-lactone.

References Cited in the file of this patent
UNITED STATES PATENTS

| | | |
|---|---|---|
| 2,740,783 | Hogg et al. | Apr. 3, 1956 |
| 2,786,857 | Cutler et al. | Mar. 26, 1957 |